United States Patent
Jaipuria et al.

(10) Patent No.: US 11,964,448 B2
(45) Date of Patent: Apr. 23, 2024

(54) MULTILAYER METALIZED CAST POLYPROPYLENE FILM (CPP)

(71) Applicant: COSMO FILMS LIMITED, New Delhi (IN)

(72) Inventors: Ashok Jaipuria, Aurangabad (IN); Ketan Ingale, Aurangabad (IN); Shriram Joshi, Aurangabad (IN); Anil Gaikwad, Aurangabad (IN)

(73) Assignee: COSMO FILMS LIMITED, New Delhi (IN)

( * ) Notice: Subject to any disclaimer, the term of this patent is extended or adjusted under 35 U.S.C. 154(b) by 133 days.

(21) Appl. No.: 17/613,205

(22) PCT Filed: Jul. 15, 2019

(86) PCT No.: PCT/IN2019/050523
§ 371 (c)(1),
(2) Date: Nov. 22, 2021

(87) PCT Pub. No.: WO2020/234890
PCT Pub. Date: Nov. 26, 2020

(65) Prior Publication Data
US 2022/0212443 A1    Jul. 7, 2022

(30) Foreign Application Priority Data
May 21, 2019    (IN) .............................. 201911020122

(51) Int. Cl.
*B32B 15/085* (2006.01)
*B32B 7/12* (2006.01)

(52) U.S. Cl.
CPC .............. *B32B 15/085* (2013.01); *B32B 7/12* (2013.01); *B32B 2307/732* (2013.01)

(58) Field of Classification Search
CPC .... B32B 15/085; B32B 7/12; B32B 2307/732
See application file for complete search history.

(56) References Cited

U.S. PATENT DOCUMENTS

| | | | |
|---|---|---|---|
| 5,194,318 A * | 3/1993 | Migliorini | B32B 15/085 428/218 |
| 6,863,964 B2 | 3/2005 | Migliorini et al. | |
| 9,080,082 B2 | 7/2015 | Thai et al. | |
| 2009/0075104 A1 * | 3/2009 | Tornatore | B32B 15/085 427/537 |
| 2015/0037556 A1 * | 2/2015 | Paulino | B32B 27/32 525/240 |

OTHER PUBLICATIONS

ISR for International Application No. PCT/IN2019/050523 dated Oct. 29, 2019.
Written Opinion for International Application No. PCT/IN2019/050523 dated Oct. 29, 2019.

* cited by examiner

Primary Examiner — Alicia J Weydemeyer
Assistant Examiner — Laura B Figg
(74) Attorney, Agent, or Firm — LADAS & PARRY LLP

(57) ABSTRACT

The present disclosure relates to a multilayer film comprising: a) a metallizable skin layer comprising a polyolefin and an antiblock; b) a middle core layer comprising a homopolymer PP resin and a stiffener; and c) a sealant layer comprising a copolymer and an antiblock. Said a multilayer film has high metal bond and high barrier properties and can be used in packaging of foods requiring very high metal bond and high barrier to oxygen and moisture.

18 Claims, 1 Drawing Sheet

MULTILAYER METALIZED CAST POLYPROPYLENE FILM (CPP)

This application is a national phase entry under 35 USC 371 of International Patent Application No.: PCT/IN2019/050523 filed on 15 Jul. 2019, which claims the benefit of Indian Application No. 201911020122 filed on 21 May 2019, the entire content of which is incorporated by reference.

FIELD OF THE INVENTION

The present disclosure relates to an adhesive film, and more particularly relates to multilayer metalized cast polypropylene (CPP) film with high metal bond and high barrier properties. Said film can be used in food packaging.

BACKGROUND OF THE INVENTION

Commercially available metallized packaging films made from cast polyethylene (CPP) face issues of poor metal adhesion and bond strengths limiting their end use application. These metalized polyethylene films have polyethylene (PE) in the skin layer(s) which may contain low molecular weight fractions of PE and low molecular weight high comonomer fractions of linear low-density polyethylene (LLDPE). Such PE-based metallized films typically exhibit very poor bond strength due to poor metal adhesion to the metalized skin layer leading to challenges during lamination as well as poor barrier properties due to metal transfer.

Existing metalized cast polyethylene (CPP) films used in food packaging have metal bond strength between 60-80 grams/inch. After lamination (with adhesive or extrusion) with biaxially oriented polypropylene films (BOPP) or Polyester Film (PET) as the second substrate, due to low adhesion of the metal layer with metalized skin, metal layer from the CPP film is transferred to the other substrate (which can be BOPP or PET) along with PE. This metal transfer also negatively affects the moisture barrier properties resulting in reduced shelf life of packed product.

U.S. Pat. No. 5,153,074 to Migliorini discloses a metalized film combination which includes a polymer substrate with an ethylene vinyl alcohol copolymer skin layer and a thin metal layer deposited on the surface of the ethylene vinyl alcohol copolymer. A maleic anhydride modified propylene homopolymer or copolymer is provided for adequate adhesion of the ethylene vinyl alcohol copolymer skin layer to the polymer substrate. The resulting metallized film exhibits outstanding resistance to the transmission of oxygen and other gases.

U.S. Pat. No. 5,194,318 to Migliorini et al. discloses a metallized oriented film combination which includes a propylene polymer substrate with a high-density polyethylene skin layer and a thin metal layer deposited on the surface of the high-density polyethylene. The resulting metallized film exhibits outstanding metal adhesion to the polymeric substrate and good barrier properties to moisture and oxygen.

U.S. Pat. No. 5,591,520 to Migliorini et al. discloses a metallized film combination which includes a propylene substrate with an amorphous polyamide skin layer and a thin metal layer deposited on the surface of the amorphous polyamide skin layer. A maleic anhydride modified propylene homopolymer or copolymer is provided for adhering the amorphous polyamide skin layer to the polymer substrate. The resulting metallized film exhibits outstanding resistance to the transmission of oxygen and other gases.

US20160144603A1 discloses a multi-layer structure comprising: (a) a skin layer comprising at least 50% by weight of an ethylene/α-olefin interpolymer composition (LLDPE) having a Comonomer Distribution Constant (CDC) in the range of from 45 to 400, and wherein the skin layer does not contain any migratory additive; (b) a metal layer disposed on the skin layer to form a metalized film; and (c) at least one substrate layer laminated onto the metallized film; wherein the ethylene/α-olefin interpolymer composition comprises (i) less than or equal to 100 percent by weight of the units derived from ethylene; and (ii) less than 30 percent by weight of units derived from one or more α-olefin comonomers is provided. Patent publication US20160144603A1 mentions about the metalized polyethylene film. In US20160144603A1, all the three layers i.e. sealant layer, core layer and skin layer to be metalized comprise of PE i.e. LDPE and LLDPE. It also uses polymer processing aid (PPA). Furthermore, the existing patent US20160144603A1 mentions about the film produced by blown film extrusion process.

None of the above prior arts disclose a multilayer metalized cast polypropylene film (CPP) with having the high metal bond strength and also with improved metal adhesion properties. Therefore, it would be desirable to produce multilayer metalized polypropylene films having the high metal bond strength and also with improved metal adhesion properties.

OBJECTS OF THE INVENTION

One object of the invention is to provide a multilayer metalized cast polypropylene (CPP) film with high metal bond strength.

Another object of the invention is to provide a multilayer metalized cast polypropylene film (CPP) improves barrier to oxygen and moisture.

SUMMARY OF THE INVENTION

In one aspect of the invention there is provided a multilayer metalized cast polypropylene (CPP) film comprising:
  a) a metallizable skin layer comprising a polyolefin and an antiblock;
  b) a middle core layer comprising a homopolymer PP resin and a stiffener; and
  c) a sealant layer comprising a copolymer and an antiblock.

In another aspect of the invention there is provided a multilayer metalized cast polypropylene (CPP) film having high metal bond strength and high barrier to oxygen and moisture used in packaging food.

These and other features, aspects, and advantages of present subject matter will become better understood with reference to the following description. This summary is provided to introduce a selection of concepts in a simplified form. This summary is not intended to identify key features or essential features of the subject matter, nor is it intended to be used to limit the scope of the subject matter.

BRIEF DESCRIPTION OF DRAWINGS

The above and other features, aspects, and advantages of the subject matter will be better understood with regard to the following description, and accompanying drawings where.

DETAILED DESCRIPTION OF THE INVENTION

Figure 1:
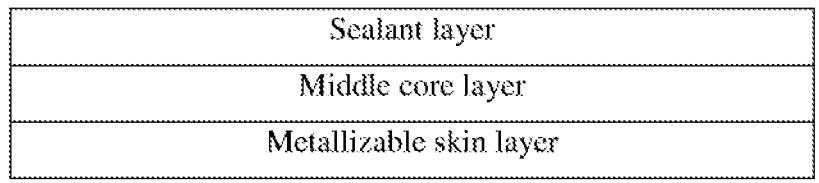
FIG. 1 is a schematic illustrating the multilayer metalized cast polypropylene (CPP) film of present disclosure.
Figure 2:
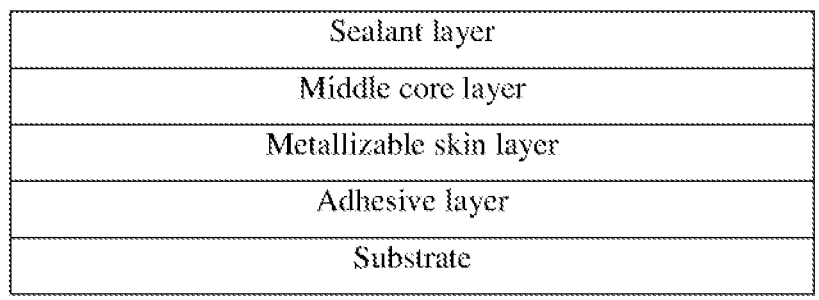
FIG. 2 is a schematic illustrating an embodiment of the multilayer metalized cast polypropylene (CPP) film of present disclosure.
Figure 3:
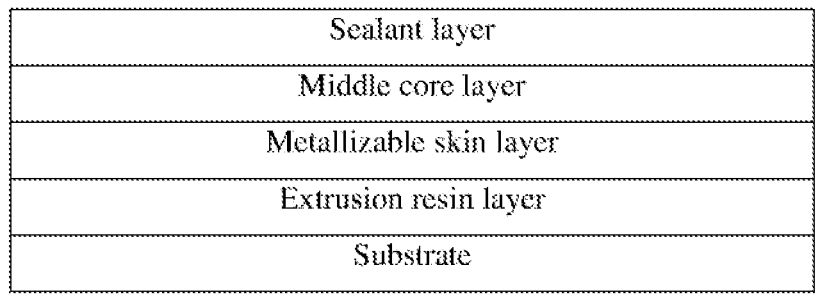
FIG. 3 is a schematic illustrating another embodiment of the multilayer metalized cast polypropylene (CPP) film of present disclosure.

For convenience, the terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article. The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of element or steps but not the exclusion of any other element or step or group of element or steps.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The instant disclosure is a multilayer metalized cast polypropylene (CPP) film with high metal bond strength and high metal bond and high barrier properties.

The multilayer metalized cast polypropylene (CPP) film according to the present disclosure comprises:
 a) a metallizable skin layer comprising a polyolefin and an antiblock;
 b) a middle core layer comprising a homopolymer PP resin and a stiffener; and
 c) a sealant layer comprising a copolymer and an antiblock.

In one embodiment of the invention, the multilayer metalized cast polypropylene (CPP) film comprises an adhesive layer applied on the metallizable skin layer and the film laminated with a substrate.

In another embodiment of the invention, the multilayer metalized cast polypropylene (CPP) film comprises an extrusion resin layer applied on the metallizable skin layer and the film laminated with a substrate.

In another embodiment of the invention, the substrate is selected from group comprising PP, PET, BOPP or any other thermoplastic flexible packing film or combination thereof.

In another embodiment of the invention, the polyolefin is selected from a group consisting of LLDPE, mLLDPE, and HDPE or combination thereof. Further, the LLDPE is in the range of 5-94 wt. %, the mLLDPE is in the range of 5-94%, the HDPE is the range of 90-95%.

In another embodiment of the invention, the antiblock in the metallizable skin layer is in the range of 1-35%. The antiblock is selected from the group consisting of synthetic silica, limestone, natural silica, talc, zeolites, organic additives etc.

In another embodiment of the invention, the homopolymer PP resin is present in the range of 100 wt. %

In another embodiment of the invention, the stiffener is present in the range of 5-30 wt. %. The stiffener is selected from the group consisting of $C_5$-$C_9$ based polymers.

In another embodiment of the invention, the copolymer is in the range of 90-98 wt. %. The copolymer is selected from the group consisting of ethylene-propylene copolymers produced using Ziegler Natta catalysts or ethylene-propylene copolymers using metallocene catalysts or terpolymers of ethylene-propylene-butylene.

In another embodiment of the invention, the antiblock in the sealant layer is present in the range of 2-10 wt. %. The antiblock in the sealant layer is selected from the group consisting of synthetic silica, limestone, natural silica, talc, zeolites, organic additives etc.

In another embodiment of the invention, the metallizable skin layer has thickness in the range of 4-35% of total film thickness. In a preferred embodiment of the invention, the skin layer has thickness in the range of 5-20% of total film thickness.

In another embodiment of the invention, the core layer has thickness in the range of 40 to 80% of total film thickness.

In another embodiment of the invention, the sealant layer has thickness in the range of 10-40% of total film thickness.

In another embodiment of the invention, the adhesive is selected from group consisting of solvent based adhesives and non-solvent based adhesives or combination thereof.

The solvent based adhesives are selected from the group consisting of acrylics, polyesters and other adhesives suitable for food grade-. The non-solvent based adhesives are selected from the group consisting of waterborne adhesives formulated from dextrins, sodium silicates, natural rubbers, emulsions based on vinyl acetate, acrylic, and polyurethane. Polyurethane dispersions of anionic polyester and aliphatic isocyanates. Crosslinkers for polyurethane dispersions can be polyaziridenes, polyisocyanates, carbodiimides, epoxies and epoxy silanes, vinyl acetate, acrylic copolymers. Solvent less adhesives comprising one part and two part polyurethanes.

In another embodiment of the invention, the surface of the metallizable skin layer is treated using corona discharge or plasma treatment or flame treatment method. A thin layer of metal is vacuum deposited on the metallizable skin layer during the metallization process. This metal layer can be of any metal, most preferably a thin aluminum layer. The metalized film is laminated on to the substrate by adhesive lamination or extrusion lamination.

The metal bond strength of the multilayer film of present disclosure is greater than 250 grams/inch. Due to such high metal bond strength values, adhesion of metal layer to the metalized skin is such that after extrusion no metal transfer is observed thereby in improving or maintaining the barrier to moisture and oxygen. Due to these attributes, multilayer film of present disclosure is suitable for all the lamination techniques.

The multilayer film according to various embodiment of present disclosure may be in the form of a pouch or a food packing film.

EXAMPLES

The following examples are given by way of illustration of the present disclosure and should not be construed to limit the scope of present disclosure. It is to be understood that both the foregoing general description and the following detailed description are exemplary and explanatory only and are intended to provide further explanation of the subject matter.

Example 1

A three-layer film, having a metallizable skin layer, a middle core layer and a sealant layer having properties shown in Table 2 below was made. Table 1 below provides the composition for each of the three layers:

TABLE 1

Components of a three-layer film

| Film layer | Component | Percentage | Thickness |
|---|---|---|---|
| Treated metallizable layer | LLDPE (MFI range 0.8 to 10 g/10 min; density 0.91 to 0.94 g/cm$^3$) | 55-94% | 4-35% |
| | mLLDPE (MFI range 0.8 to 10 g/10 min; density 0.91 to 0.936 g/cm$^3$) | 5-35% | |
| | Antiblock in PP carrier (organic or inorganic additive with the additive loading between 2% to 25%) | 1-10% | |
| Core layer | Homopolymer PP | 100% | 40-80% |
| Sealant layer | Copolymer with Seal Initiation temperature 80-125° C. | 90-98% | 10-40% |
| | Antiblock in PP carrier (organic or inorganic additive with the additive loading between 2% to 25%) | 2-10% | |

TABLE 2

Properties of a three-layered film

| Criteria | |
|---|---|
| Optical density | 1.8 to 3.0 |
| Metal bond strength | >300 grams/inch |
| MVTR | <1.0 g/m$^2$ - day |
| OTR | <125 cc/m$^2$ -day |

Example 2

A three-layer film, having a metallizable skin layer, a middle core layer and a sealant layer having properties shown in Table 4 below was made. Table 3 below provides the composition for each of the three layers:

TABLE 3

Components of a three-layer film

| Film layer | Component | Percentage | Thickness |
|---|---|---|---|
| Treated metallizable layer | LLDPE (MFI range 0.8 to 10 g/10 min; density 0.91 to 0.94 g/cm$^3$) | 5-35% | 4-35% |
| | mLLDPE (MFI range 0.8 to 10 g/10 min; density 0.91 to 0.936 g/cm$^3$) | 94-55% | |
| | Antiblock in PE or PP carrier (organic or inorganic additive with the additive loading between 2% to 25%) | 1-10% | |
| Core layer | Homopolymer PP | 100% | 40-80% |
| Sealant layer | Copolymer with Seal Initiation temperature 80-125° C. | 90-98% | 10-40% |
| | Antiblock in PP carrier (organic or inorganic additive with the additive loading between 2% to 25%) | 2-10% | |

TABLE 4

Properties of a three-layered film

| Criteria | |
|---|---|
| Optical density | 1.8 to 3.0 |
| Metal bond strength | >300 grams/inch |
| MVTR | <1 g/m² - day |
| OTR | <125 cc/m² -day |

Example 3

A three-layer film, having a metallizable skin layer, a middle core layer and a sealant layer having properties shown in Table 6 below was made. Table 5 below provides the composition for each or the three layers:

TABLE 5

Components of a three-layer film

| Film layer | Component | Percentage | Thickness |
|---|---|---|---|
| Treated metallizable layer | HDPE (MFI range 0.8 to 10 g/10 min; density 0.94 to 0.965 g/cm³) | 90-95% | 4-35% |
| | Antiblock in PE or PP carrier (organic or inorganic additive with the additive loading between 2% to 25%) | 5-35% | |
| Core layer | Homopolymer PP | 100% | 40-80% |
| Sealant layer | Copolymer with Seal Initiation temperature 80-125° C. | 90-98% | 10-40% |
| | Antiblock in PP carrier (organic or inorganic additive with the additive loading between 2% to 25%) | 2-10% | |

TABLE 6

Properties of a three-layered film

| Criteria | |
|---|---|
| Optical density | 1.8 to 3.0 |
| Metal bond strength | >250 grams/inch |
| MVTR | <0.3 g/m² - day |
| OTR | <30 cc/m² -day |

Example 4: Comparative Example

The following example illustrates that the multilayer metalized cast polypropylene (CPP) film of present invention has better metal bond strength in comparison to existing metalized CPP films.

| Structure | Existing Metalized CPP Bond strength (grams/in) | Metalized CPP of present application Bond strength (grams/in) |
|---|---|---|
| Extrusion PE to Metalized CPP | 30-47 | 140-175 |
| Metal bond strength by AIMCAL TP-105-92 | 60-80 | Greater than 300 |

Example 5: Bond Strength Calculation

Metal adhesion or the metal bond strength is calculated using EAA seal and peel test (AIMCAL TP-105-92)

Metallizable skin of the present invention comprises of blend of m-LLDPE and LLDPE as against the PP based copolymers used in existing metalized CPP films. This new skin composition provides high metal bond/adhesion. Stiffeners which are used in the core layer help in improving the barrier to moisture and oxygen. These features are absent in existing films.

Advantage of the Invention

High metal bond of the multilayer metalized cast polypropylene (CPP) film of present disclosure prevents transfer or removal of metal from the metalized skin layer which helps in retaining the barrier to oxygen and moisture thus extending the shelf life of products.

USE/FUNCTION/INDUSTRIAL APPLICATION

The multilayer metalized cast polypropylene (CPP) film of present disclosure can be used in packaging of foods requiring very high metal bond and high barrier to oxygen and moisture. For example: packaging bakery products, spices, snacks etc.

The multilayer metalized cast polypropylene (CPP) film of present disclosure is not limited to the embodiments discussed herein and can be embodied by various modifications within the scope of the following claims. It should be recognized that the preferred embodiments described above are exemplary only. Certain modifications and improvements will occur to the person skilled in the art upon a reading of forgoing description. It should be understood that all such modifications and improvements have been deleted herein for the sake of conciseness and readability but are properly within the scope of the following claims.

We claim:

1. A multilayer metalized cast polypropylene (CPP) film comprising:
   a) a metallized skin layer comprising a polyolefin and an antiblock;
   b) a middle core layer consisting of a homopolymer PP resin and a stiffener selected from the group consisting of $C_5$-$C_9$ based polymers; and
   c) a sealant layer comprising a copolymer and an antiblock.

2. The multilayer metalized cast polypropylene (CPP) film as claimed in claim 1, wherein the multilayer film comprises an adhesive layer applied on the metallized skin layer.

3. The multilayer metalized cast polypropylene (CPP) film as claimed in claim 1, wherein the multilayer film comprises an extrusion resin layer applied on the metallized skin layer.

4. The multilayer metalized cast polypropylene (CPP) film as claimed in claim 2, wherein the multilayer film is laminated with a substrate.

5. The multilayer metalized cast polypropylene (CPP) film as claimed in claim 4, wherein the substrate is selected from a group consisting of PP, PET, BOPP or thermoplastic flexible packing film.

6. The multilayer metalized cast polypropylene (CPP) film as claimed in claim 1, wherein the polyolefin is selected from a group consisting of LLDPE, mLLDPE, and HDPE or combination thereof.

7. The multilayer metalized cast polypropylene (CPP) film as claimed in claim 6, wherein the polyolefin comprises LLDPE in the range of 5-94 wt. %.

8. The multilayer metalized cast polypropylene (CPP) film as claimed in claim 6, wherein the polyolefin comprises mLLDPE in the range of 5-94%.

9. The multilayer metalized cast polypropylene (CPP) film as claimed in claim 6, wherein the polyolefin comprises HDPE the range of 90-95%.

10. The multilayer metalized cast polypropylene (CPP) film as claimed in claim 1, wherein the antiblock in the metallized skin layer is in the range of 1-35%.

11. The multilayer metalized cast polypropylene (CPP) film as claimed in claim 1, wherein the stiffener is present in the range of 5-30 wt. %.

12. The multilayer metalized cast polypropylene (CPP) film as claimed in claim 1, wherein the copolymer is in the range of 90-98 wt. %.

13. The multilayer metalized cast polypropylene (CPP) film as claimed in claim 1, wherein the antiblock in the sealant layer is present in the range of 2-10 wt. %.

14. The multilayer metalized cast polypropylene (CPP) film as claimed in claim 1, wherein the metallized skin layer has thickness in the range of 4-35% of total film thickness.

15. The multilayer metalized cast polypropylene (CPP) film as claimed in claim 1, wherein the core layer has thickness in the range of 40-80% of total film thickness.

16. The multilayer metalized cast polypropylene (CPP) film as claimed in claim 1, wherein the sealant layer has thickness in the range of 10-40% of total film thickness.

17. The multilayer metalized cast polypropylene (CPP) film as claimed in claim 2, wherein the adhesive is selected from group consisting of solvent based adhesives and non-solvent based adhesives or combination thereof.

18. The multilayer metalized cast polypropylene (CPP) film as claimed in claim 3, wherein the multilayer film is laminated with a substrate.

\* \* \* \* \*